Oct. 22, 1963 R. H. ROYSTER 3,107,582
FLUID PRESSURE ACTUATOR AND LOCKING MEANS
Filed May 15, 1961 4 Sheets-Sheet 1

INVENTOR
ROBERT H. ROYSTER
BY /s/ Almon A. Nelson
ATTORNEY

United States Patent Office 3,107,582
Patented Oct. 22, 1963

3,107,582
FLUID PRESSURE ACTUATOR AND
LOCKING MEANS
Robert H. Royster, Pasadena, Calif.
(718 Poinsettia, Corona Del Mar, Calif.)
Filed May 15, 1961, Ser. No. 109,885
13 Claims. (Cl. 92—24)

This invention relates to fluid pressure or hydraulically operated mechanisms and more particularly to a fluid pressure actuator and locking means which may be utilized in the landing gear structure of aircraft or for any other application where it is desired to utilize fluid pressure actuated means for moving an element to a desired position and for thereafter locking the element in such position.

Heretofore numerous types of fluid pressure actuators incorporating locking means have been proposed and utilized, particularly in connection with the aircraft industry and while these prior art devices have operated satisfactorily insofar as providing a motive force for moving an element from one position to another, the locking means incorporated therein has given considerable trouble, in that in general, such prior art locking means has involved relatively delicate toggle mechanisms and frequent failure thereof has been experienced. Moreover, these prior art locking devices incorporated in fluid pressure actuators have been relatively complex and costly to manufacture and furthermore, repair thereof or replacement upon failure has also been relatively costly also in some instances, as the result of wear, play has developed between the parts of the locking mechanism which has sometimes resulted in failure to provide a positive lock with the result that inadvertent movement of the element operated by the fluid pressure actuator has taken place, which in certain instances could be disastrous.

It is accordingly an object of the invention to provide a fluid pressure actuator and locking means which may be conveniently and economically constructed from readily available materials and which will provide a positive lock, regardless of wear or play between the parts.

A further object of the invention is the provision of a fluid pressure actuator and locking means in which the locking mechanism is relatively simple and eliminates the use of levers or toggle mechanisms thereby reducing likelihood of failure to a minimum.

A still further object of the invention is the provision of a fluid pressure actuator and locking means in which the locking action is accomplished by a combination of spring means and fluid pressure means thereby providing for operation of the locking means by either the spring means or fluid pressure means in the event of failure of one or the other.

Another object of the invention is the provision of a fluid pressure actuator and locking means in which the entire operation of the device is controlled merely by the admission of fluid pressure thereto.

A further object of the invention is the provision of a fluid pressure actuator and locking means which may be constructed as a double acting or a single acting device while still utilizing the same basic actuating and locking mechanisms.

A still further object of the invention is the provision of a fluid pressure actuator and locking means in which the locking means includes radially movable locking detents in the form of bolts and in which two, three or four circumferentially spaced bolts may be utilized depending upon the size and load requirements while still utilizing the same basic locking mechanism.

Another object of the invention is the provision of a fluid pressure actuator and locking means in which the locking means includes radially movable locking detents actuated by locking cam means, including inclined and flat surfaces in contact with cam rollers, all of the parts being in contact at all times and in compression, thereby providing a particularly strong structure and reducing the likelihood of failure.

A further object of the invention is the provision of a fluid pressure actuator and locking means in which the locking means includes radially movable locking detents actuated by locking cam mechanism, including inclined and flat surfaces and cam rollers engaging the same in which the inclined and flat surfaces are provided on the locking detents and the cam rollers are retained in plungers actuated by a spring or fluid pressure or both.

A still further object of the invention is the provision of a fluid pressure actuator and locking means in which the locking means includes radially movable detents actuated by locking cam means, including inclined and flat surfaces engaged by cam rollers in which such rollers are retained in the inner ends of the locking detents and the inclined and flat surfaces are provided on plungers actuated by a spring or fluid pressure or both.

Another object of the invention is the provision of a fluid pressure actuator and locking means in which the locking means includes radially movable locking detents which are actuated by locking cam means, including inclined and flat surfaces engaged by a roller and in which a flat surface is provided on the inner end of each detent and inclined and flat surfaces on a plunger, the roller being disposed between the plunger and each detent and the roller being eccentrically mounted in order to move the detent by an amount equal to the height of the inclined surface plus the eccentricity of the roller.

A further object of the invention is the provision of a fluid pressure actuator and locking means constructed as a double acting device which will pull or push in either direction and in which the device may be locked in position at both ends of the stroke.

A further object of the invention is the provision of a fluid pressure actuator and locking means which may be constructed as a single acting device for pushing only, and in which the device may be locked in position at one end of the stroke.

A still further object of the invention is the provision of a fluid pressure actuator and locking means which may be constructed as a single acting device for pulling only, and in which the device may be locked in position at one end of the stroke.

Further objects and advantages of the invention will be apparent from the following description taken in conjunction with the accompanying drawings wherein.

With continued reference to the drawings and particularly to FIGS. 1 to 5, there is shown a double acting fluid pressure actuator and locking means constructed in accordance with this invention and which may well comprise an elongated hollow cylinder 10, the end surfaces of which 11 and 12 are beveled outwardly. A cylinder head 13 is secured by screw threaded or other suitable means 14 to one end of the cylinder 10 and suitable packing means 15 may be provided between the cylinder head 13 and cylinder 10 in order to provide a fluid tight connection therebetween. The cylinder head 13 may be provided with an outwardly extending ear 16 having an aperture 17 therein for facilitating attachment of the device to a cooperating structure and it is also to be noted, that the cylinder head 13 is provided with an inner annular shoulder 18 spaced from the beveled end 11 of the cylinder 10 in order to provide an inwardly opening annular recess 19 between the cylinder head 13 and the beveled end 11 of the cylinder 10. The cylinder head 13 is also provided with a fluid pressure inlet 20 communicating with the bore 21 of the cylinder 10 through a passage 22 in the cylinder head 13.

Figure 1:
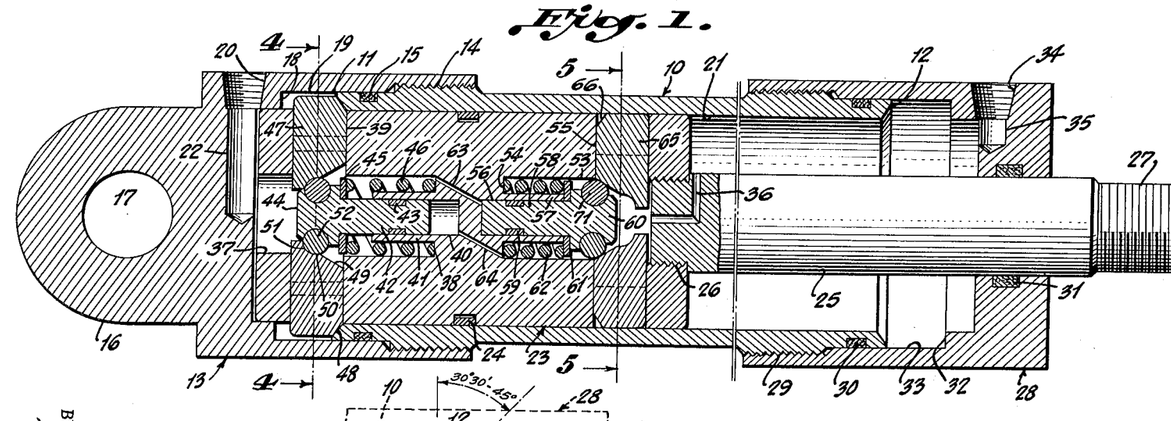
FIG. 1 is a longitudinal sectional view of a fluid pressure actuator and locking means constructed in accordance with this invention and showing the device locked in position at one end of the stroke.

A piston 23 is slidably received in the bore 21 of the cylinder 10 and suitable packing means 24 may be provided on the piston 23 for engaging the wall of the bore 21 in order to provide a fluid pressure seal therebetween. A piston rod 25 may be detachably secured by screw threaded or other suitable fastening means 26 to the piston 23 and the piston rod 25 projects from the opposite end of the cylinder 10 from the cylinder head 13 and the piston rod 25 may be provided with screw threads 27 or other suitable means at the outer end thereof to facilitate attachment of the piston rod 25 to an element to be operated thereby.

A second cylinder head 28 is secured to the cylinder 10 opposite the cylinder head 13 by screw threaded or other suitable means 29 and suitable packing means 30 may be provided between the cylinder 10 and the cylinder head 28 in order to provide a fluid tight connection therebetween. The cylinder head 28 is also provided with suitable packing means 31 engaging the piston rod 25 in order to prevent leakage of fluid pressure therebetween while still providing for sliding movement of the piston rod 25. An inner annular shoulder 32 formed on the cylinder head 28 is spaced from the adjacent beveled end 12 of the cylinder 10 in order to provide a second inwardly opening annular recess 33 at the opposite end of the cylinder 10 from the annular recess 19. The cylinder head 28 is provided with a second fluid pressure inlet 34 communicating through a passage 35 with the bore 21 of the cylinder 10. It is also to be noted, that the inner end of the piston rod 25 is provided with a passage 36 communicating with the bore 21 of the cylinder 10 and opening inwardly of the inner end of the piston rod 25. The purpose of this passage 36 will be later described.

The piston 23 is provided at the end opposite the piston rod 25 with a central axial bore 37 terminating at a point 38 within the piston 23 and a plurality of radial apertures 39 are formed in the piston 23 communicating with the bore 37 and opening radially outwardly of the piston 23. A second central axial bore 40 of smaller diameter than the bore 37 and concentric therewith is provided in the piston 23 and as shown in FIG. 1, the bores 37 and 40 are so formed as to provide a sleeve 41 therebetween. A plunger 42 is slidably disposed in the bore 40 and the plunger 42 may be provided with suitable packing means 43 engaging the wall of the bore 40 to provide a fluid tight engagement therebetween. An annular flange 44 is provided on the outer end of the plunger 42 and engaging the rear surface of the flange 44 is a washer 45 which in turn is engaged by the outer end of a compression spring 46 received in the bore 37 with the inner end of the spring 46 engaging the inner end 38 of the bore 37.

Locking detents in the form of cylindrical bolts 47 are slidably disposed in the apertures 39 and the outer ends of the detents 47 are provided with beveled surfaces 48 cooperating with the beveled end surface 11 on the cylinder 10 and the inner ends of the detents 47 are provided with inclined surfaces 49 terminating in flat surfaces 50 which merge into arcuate surfaces 51 and such surfaces serve to engage cam rollers 52 mounted in the flange 44 of the plunger 42. The specific structure and operation of the detents 47 and cam rollers 52 will be described in connection with such structure at the opposite end of the piston 23 which is identical therewith.

A central axial bore 53 is provided in the opposite end of the piston 23 and the bore 53 terminates at a point 54 in the piston 23. A plurality of radial apertures 55 are provided in the piston 23 communicating with the bore 53 and opening radially outwardly of the piston 23. A second central axial bore 56 concentric with the bore 53 and of smaller diameter is provided in the piston 23 and as shown in FIG. 1, the relationship of bores 53 and 56 is such as to provide a sleeve 57 therebetween. Slidably received in the second bore 56 is a plunger 58 and suitable packing means 59 may be provided thereon engaging the wall of the bore 56 in order to provide a fluid tight connection therebetween. An annular flange 60 is provided on the outer end of the plunger 58 and a washer 61 is disposed in engagement with the inner side of the flange 60, the washer 61 in turn being engaged by the outer end of a compression spring 62 disposed in the bore 53 with the inner end of the spring 62 engaging the inner end 54 of the bore 53. A fluid pressure passage 63 is provided between the bore 37 and the bore 56 and a similar fluid pressure passage 64 is provided between the bore 40 and the bore 53. The purpose and operation of these passages 63 and 64 will be presently described.

Figure 2:
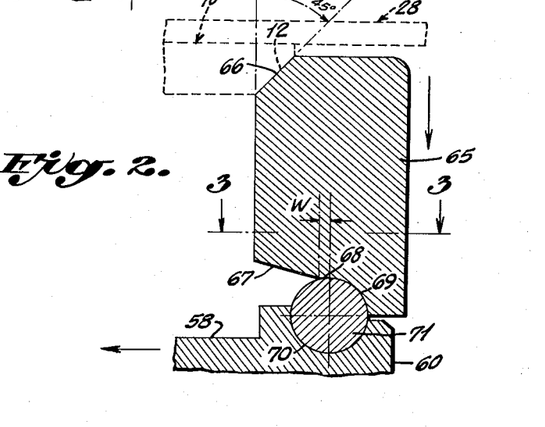
FIG. 2 is a fragmentary sectional view showing the details of the locking detents of FIG. 1, together with the mounting for the cam roller engaging such detents.
Figure 3:
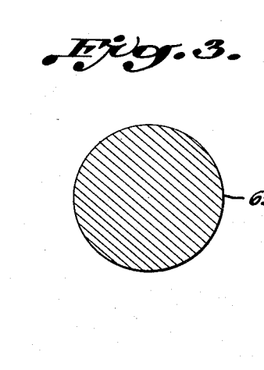
FIG. 3 is a sectional view taken substantially on the line 3—3 of FIG. 2.

With particular reference to FIGS. 1, 2, 3 and 5, locking detents 65 in the form of cylindrical bolts are slidably received in the radial apertures 55 and the detents 65 are provided with beveled surfaces 66 on the outer ends thereof for cooperating with the beveled end surface 12 on the cylinder 10. As best shown in FIG. 2, each locking detent 65 is provided on the inner end thereof with an inclined surface 67 which terminates in a flat surface 68 having a width at least equal to the distance w and merging into an arcuate surface 69. An arcuate recess 70 is provided in the flange 60 of the plunger 58 opposite each locking detent 65 and received in each arcuate recess 70 is a roller 71. It will be noted from an inspection of FIG. 2 that the angular length of the arcuate recess 70 is greater than one hundred eighty degrees and consequently, the roller 71, while rotatable in the recess 70, cannot be removed therefrom except axially of the roller 71 upon removal of the plunger 58 from the piston 23. While the locking detents 65 have been shown and described as being cylindrical, it is to be understood that the same may be of any other desired shape or formation but for convenience of manufacture the cylindrical shape is to be preferred.

In FIG. 1, the piston 23 is shown locked in retracted position by engagement of the outer ends of the detents 47 with the beveled end surface 11 of the piston 10 with the outer ends of the detents 47 disposed in the annular recess 19 and in order to operate the device to extend the piston rod 25, it is only necessary to introduce fluid pressure through the inlet 20 and passage 22 into the bore 21 of the cylinder 10, at which time, such fluid pressure will impinge on the flange 44 of the plunger 42 and urge such plunger inwardly of the bore 40 in the piston 43 against the action of spring 46 which will permit inward movement of the locking detents 47 by the camming action between the outer beveled surfaces 48 of the detents 47 and the beveled end surface 11 of the cylinder 10. The fluid pressure in the bore 21 of the cylinder 10 will, therefore, urge the piston 23 toward the right as viewed in FIG. 1 and when the piston reaches the opposite end of the stroke, fluid pressure flowing through the passage 63 from the bore 37 to the bore 56, together with the compression spring 62 will urge the plunger 58 outwardly of the piston 23 which will result in the rollers 71 engaging the inclined surfaces 67 on the inner ends of the detents 65 which will operate to move the detents 65 radially outwardly into the annular recess 33 and with the beveled end surfaces 66 on the detents 65 engaging the beveled end surface 12 on the cylinder 10 to lock the piston 23 in position at the extended end of the stroke. The locking detents 65 are locked in outermost locking position by reason of the fact the rollers 71 upon leaving the inclined surfaces 67 engage the flat surfaces 68 on the inner ends of the detents 65 and, therefore, any inward force exerted on the detents 65 will not exert a camming action on the rollers 71 tending to urge the plunger 58 inwardly of the piston 23 and consequently, the detents 65 will be firmly locked in position until such time as the plunger 58 is retracted. Engagement of the arcuate surfaces 69 with the rollers 71 restrict outward movement of the plunger 58, but other means may be utilized for this purpose if desired, since the arcuate surfaces 69 perform no significant function in the locking action.

When it is desired to return the piston 23 to the opposite end of the cylinder as shown in FIG. 1, it is only necessary to introduce fluid pressure through the fluid pressure inlet 34 and passage 35 to the bore 21 of the cylinder 10, at which time, such fluid pressure will flow through the passage 36 in the piston rod 25 and impinge on the flange 60 of the plunger 58 to move the plunger inwardly of the piston 23, at which time the rollers 71 will move from the flat surfaces 68 on the locking detents 65 onto the inclined surfaces 67 thereby permitting the locking detents 65 to move radially inwardly by reason of the camming action between the beveled outer end surfaces 66 of the detents 65 engaging the beveled end surface 12 of the cylinder 10. The piston 23 will thereupon move to the opposite end of the cylinder as shown in FIG. 1 and fluid pressure flowing through the passage 64 from the bore 53 to the bore 40, together with the compression spring 46 will operate to move the plunger 42 outwardly and engagement of the rollers 52 on the flange 44 of the plunger 42 with the inclined surfaces 49 on the locking detents 47 will operate to move such detents radially outwardly into the annular recess 19 and into engagement with the beveled end surface 11 of the cylinder 10 and upon movement of the rollers 52 into engagement with the flat surface 50 on the locking detents 47, such detents will be locked in outermost locking position thereby retaining the piston 23 against movement in the opposite direction.

While the operation of the plungers 42 and 58 has been described as resulting from fluid pressure flowing through the passage 63 or 64 in conjunction with the compression spring 46 or 62, it is to be understood that in the event of failure of either the compression spring 46 or 62, the fluid pressure will serve to operate the plunger 42 or 58 and also in the event one or more of the passages 63 or 64 becomes clogged, the compression spring 46 or 62 will serve to actuate the plunger 42 or 58 to perform the locking action.

Figure 4:
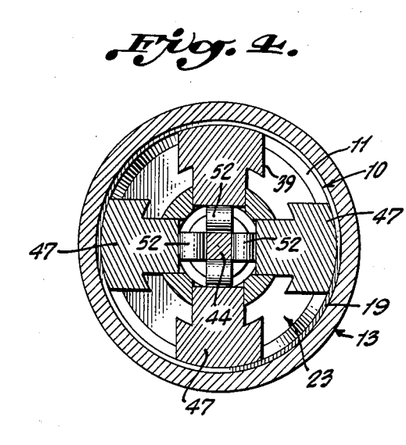
FIG. 4 is a sectional view taken substantially on the line 4—4 of FIG. 1 and showing the locking detents in extended or locking position.
Figure 5:
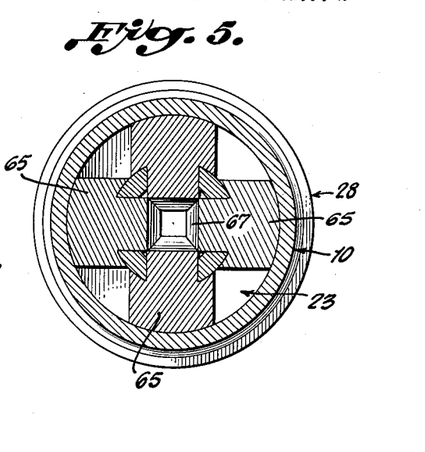
FIG. 5 is a sectional view taken substantially on the line 5—5 of FIG. 1 and showing the locking detents in retracted or unlocked position.
Figure 6:
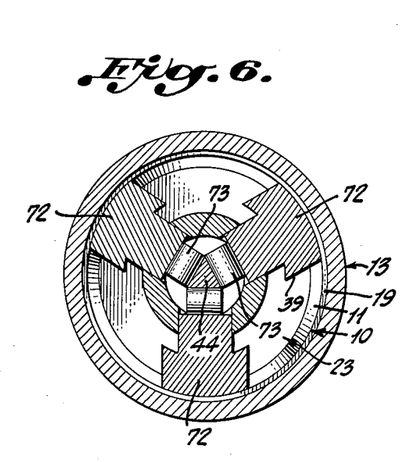
FIG. 6 is a sectional view, similar to FIG. 4, but showing the position and use of three locking detents.

With particular reference to FIG. 6, a modified arrangement of locking detents is shown in which three such detents 72 are slidably mounted in the radial apertures 39 of the piston 23 and such detents 72 are engaged by three associated cam rollers 73 mounted in the flange 44 of the plunger 42 and with the exception of the number of detents 72 and disposition thereof, the structure and operation is the same as that described above in connection with the use of four locking detents as shown in FIGS. 1, 4 and 5.

Figure 7:
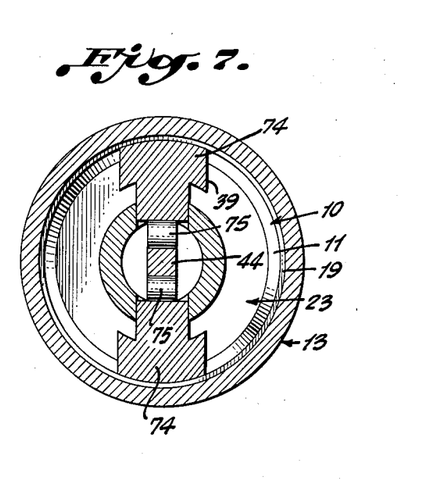
FIG. 7 is a sectional view, similar to FIG. 4, but showing the use of two diametrically opposed locking detents.

A still further modified arrangement of locking detents is shown in FIG. 7 in which two such detents 74 are provided in diametrically opposed relationship in radial apertures 39 in the piston 23 and the detents 74 are engaged by rollers 75 mounted in the flange 44 of the plunger 42. This arrangement, of course, operates in the same manner as described above in connection with FIGS. 1, 4 and 5. The locking detent arrangement shown in FIGS. 6 and 7 may be utilized where size and load requirements permit such an arrangement and it is, of course, understood that these detent arrangements will be duplicated at both ends of the piston and the basic structure and operation is the same in all instances.

Figure 8:
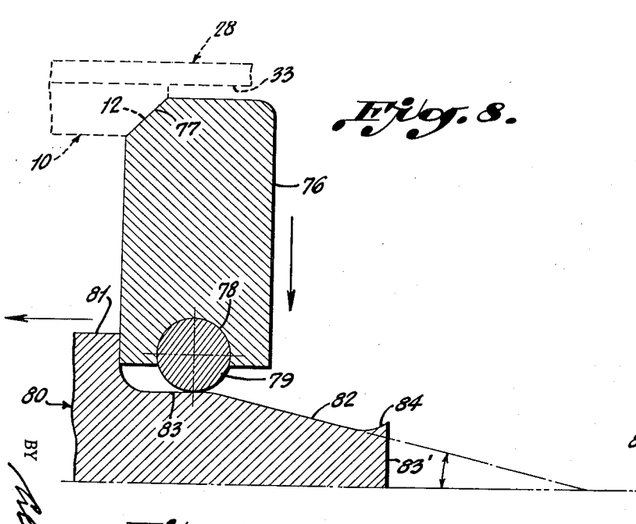
FIG. 8 is a fragmentary sectional view, similar to FIG. 2, showing a locking detent in locked position, but with the cam roller secured in the inner end of the detent and with the inclined and flat surfaces on the actuating plunger.
Figure 9:
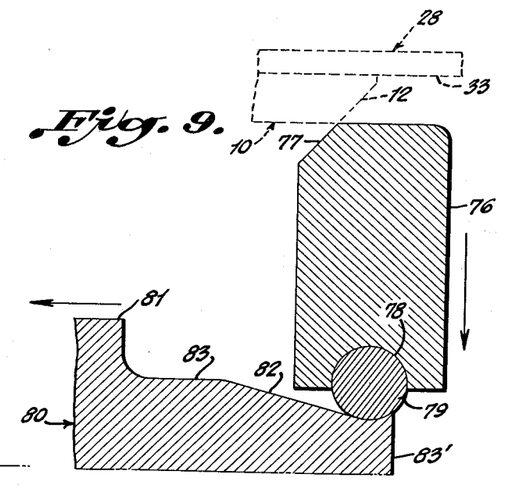
FIG. 9 is a fragmentary sectional view similar to FIG. 8 and showing the detent in unlocked position.

With particular reference to FIGS. 8 and 9, there is shown a modified form of locking cam means in which each of the radially movable detents 76 are provided with a beveled surface 77 on the outer end thereof for cooperating with the beveled end surfaces, such as 12 on the cylinder 10 and in which the detent 76 is provided at the inner end thereof with an arcuate recess 78 which serves to rotatably receive a cam roller 79. It is to be noted, that the angular length of the arcuate recess 78 is greater than one hundred eighty degrees and, therefore, the roller 79 is retained therein and may only be removed from the recess 78 in a direction axially of the roller 79 and such movement may only take place upon removal of the detents 76 from the apparatus.

The plunger 80 is provided with a flange 81 at the outer end thereof as in the structure previously described, and such flange 81 is provided with an inclined surface 82 extending inwardly from the outer end 83 of the plunger 80 and the inclined surface 82 terminates in a flat surface 83 disposed at right angles to the longitudinal axis of the detent 76 and the inclined surface 82 may terminate at the opposite end thereof in an arcuate surface 84.

As shown in FIG. 8, the detent 76 is in locked position and is held in such position by engagement of the roller 79 with the flat surface 83 on the flange 81 of the plunger 80 and since the flat surface 83 is disposed at right angles to the longitudinal axis of the detent 76, any tendency of the detent 76 to move inwardly will be prevented, since no camming action can be exerted by the roller 79 against the flat surface 83. When it is desired to permit movement of the detent 76 to unlocked position as shown in FIG. 9, the plunger 80 is moved toward the left as viewed in FIG. 8, at which time the roller 79 will move away from the flat surface 83 and engage the inclined surface 82 to permit the detent 76 to move radially inwardly in the piston. Disengagement of the roller 79 from the inclined surface 82 may be prevented by engagement of the roller 79 with the arcuate surface 84 on the outer end of the flange 81 of the plunger 80, but, of course, other means for preventing such disengagement may be utilized if such is desired. The detent 76 is shown in unlocked position in FIG. 9 and when it is desired to again move the detent 76 into locked position, it is only necessary to permit the plunger 80 to move toward the right, at which time the roller 79 will move up the inclined surface 82 to move the detent 76 outwardly and upon engagement of the roller 79 with the flat surface 83, the detent 76 will again be locked in locking position.

Figure 10:
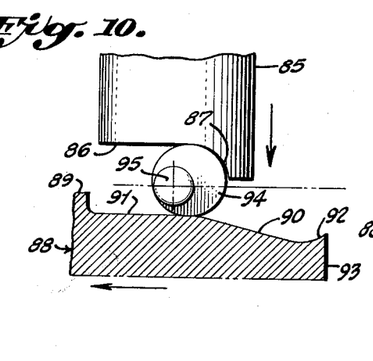
FIG. 10 is a fragmentary sectional view similar to FIG. 8 and showing a further modified form of actuating mechanism for the locking detents in which the detent is in locked position and with a flat surface on the inner end of the detent engaged by a roller eccentrically mounted, the roller in turn engaging inclined and flat surfaces on an actuating plunger to move the detent and lock the same in position.
Figure 11:
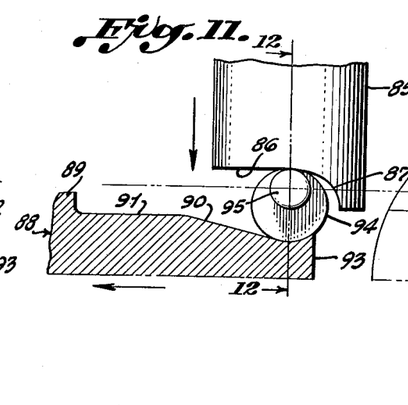
FIG. 11 is a fragmentary sectional view similar to FIG. 10, but showing the detent in unlocked position.
Figure 12:
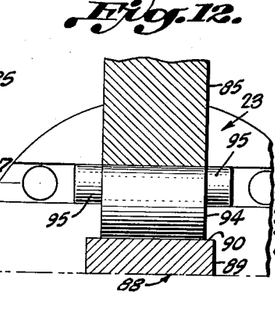
FIG. 12 is a sectional view taken substantially on the line 12—12 of FIG. 11.

A still further modified form of locking cam means is shown in FIGS. 10 to 12 in which a locking detent 85 is movable radially in the piston and the inner end of the detent 85 is provided with a flat surface 86 disposed at substantially right angles to the longitudinal axis of the detent 85 and the flat surface 86 merges into an arcuate surface 87. A plunger 88 is provided on the outer end thereof with a flange 89 which in turn is provided with an inclined surface 90 terminating in a flat surface 91 disposed at substantially right angles to the longitudinal axis of detent 85 and the opposite end of the inclined surface 90 may, if desired, terminate in an arcuate surface 92 at the outer end 93 of the plunger 88. A cam roller 94 is disposed between the inner end of the locking detent 85 and the flange 89 of the plunger 88 and the roller 94 is provided at opposite ends thereof with eccentrically disposed trunnions 95 which serve to rotatably and eccentrically mount the roller 94 in the piston of the device.

In the operation of the locking cam means shown in FIGS. 10 to 12 the same is shown in locked position in FIG. 10 with the detent 85 projected outwardly and with the roller 94 engaging the flat surface 86 on the detent 85, as well as the arcuate surface 87 which is of the same radius as the roller 94 and also engaging the flat surface 91 on the flange 89 of the plunger 88. The detent 85 is locked in such position by reason of the fact that no camming action can take place between the flat surfaces 86 and 91 and the roller 94 as the result of an inward force exerted on the detent 85. When it is desired to release the detent 85 from locking position, it is only necessary to move the plunger 88 toward the left as viewed in FIGS. 10 and 11, at which time the roller 94 will move from the flat surface 91 onto the inclined surface 90 which will permit movement of the detent 85 inwardly, but at the same time, the roller 94 will rotate on the eccentric trunnions 95 and will also move away from the arcuate surface 87 as shown in FIG. 11 which results in movement of the detent 85 an amount equal to the sum of the height of the inclined surface 90 and the eccentricity of the roller 94. Disengagement of the roller 94 from the inclined surface 90 may if desired, be prevented by engagement of the roller 94 with the arcuate surface 92 at the outer end 93 of the flange 89 of the plunger 88, although other means for this purpose may be utilized if desired. When it is desired to return the detent 85 to locking position, it is only necessary to move the plunger 88 toward the right as viewed in FIG. 11, at which time the roller 94 will move up the inclined surface 90 and at the same time, the roller 94 will rotate about the eccentric trunnions 95 which will result in moving the detent 85 outwardly an amount equal to the height of the inclined surface 90. Continued movement of the plunger 88 toward the right will result in the roller 94 engaging the flat surface 91 on the flange 89 of the plunger 88 as shown in FIG. 10, to again lock the detent 85 in outermost locking position.

Figure 13:
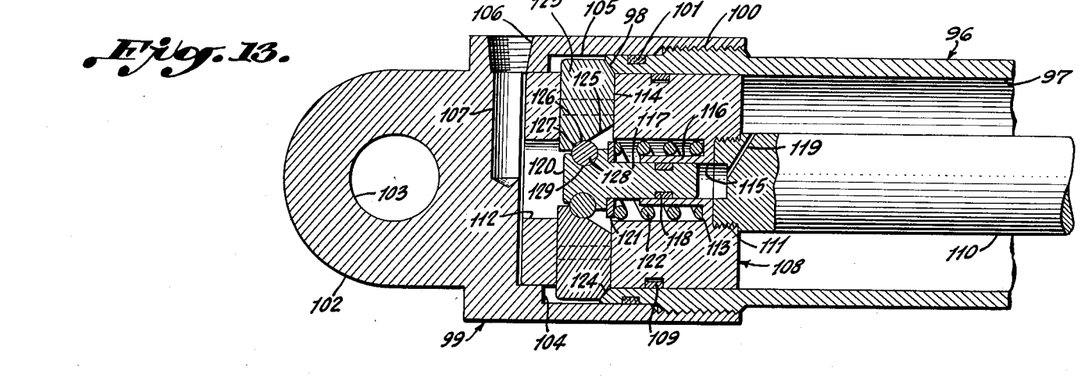
FIG. 13 is a fragmentary longitudinal sectional view showing a single acting fluid pressure actuator and locking means constructed in accordance with this invention and with the device locked in position at one end of the stroke prior to performing a pushing operation.

With particular reference to FIG. 13, there is shown a single acting fluid pressure actuator and locking means constructed in accordance with this invention and which may well comprise an elongated hollow cylinder 96 having a bore 97 therein and having one end of the cylinder 96 beveled outwardly as shown at 98. A cylinder head 99 is removably secured by screw threaded means 100 or other suitable means on the beveled end of the cylinder 96 and suitable packing means 101 may be provided to form a fluid tight connection between the cylinder head 99 and the cylinder 96. The cylinder head 99 may be provided with an ear 102 having an aperture 103 therein for facilitating attachment of the device to a cooperating structure. The cylinder head 99 is provided with an internal shoulder 104 which is spaced from the beveled end 98 of the cylinder 96 and serves to provide an internal annular recess 105, the purpose of which will presently appear. The cylinder head 99 is also provided with a fluid pressure inlet 106 which communicates through a passage 107 with the bore 97 of the cylinder 96.

A piston 108 is slidably received in the bore 97 of the cylinder 96 and suitable packing means 109 may be utilized on the piston 108 for providing a fluid tight connection between such piston and the wall of the bore 97. A piston rod 110 may be detachably connected to the piston 108 by screw threaded fastening means or the like 111 and the piston rod 110 will, of course, project from the end of the cylinder 96 opposite to the cylinder head 99, since in this form of the invention the device is adapted to provide a pushing action in a direction away from the cylinder head 99.

The piston 108 is provided with a central axial bore 112 terminating at a point 113 within the piston 108 and a plurality of radial apertures 114 are provided in the piston 108 communicating with the bore 112. A second bore 115 smaller in diameter and concentric with the bore 112 is provided in the piston 108 and the relationship between the bore 112 and 115 is such as to provide a sleeve 116 therebetween. A plunger 117 is slidably disposed in the bore 115 and suitable packing means 118 may be utilized to provide a fluid tight seal between the plunger 117 and the wall of the bore 115. A bleed passage 119 leads from the inner end of the bore 115 through the connecting rod 110 to the bore 97 of the cylinder 96 at the opposite side of the piston 108 from the cylinder head 99.

The outer end of the plunger 117 is provided with an annular flange 120 and engaging the inner side of the flange 120 is a washer 121 which in turn is engaged by the outer end of a compression spring 122 disposed in the bore 112, the inner end of the compression spring 122 engaging the inner end 113 of the bore 112. A plurality of locking detents 123 are slidably disposed in the radial apertures 114 and the outer ends of the detents 123 are provided with beveled surfaces 124 for engaging and cooperating with the beveled surface 98 on the end of the cylinder 96. The inner ends of the detents 123 may be provided with inclined surfaces 125 terminating in flat surfaces 126 which in turn merge into arcuate surfaces 127 as described above in connection with the form of the invention shown in FIG. 1, and disposed between the inner ends of the detents 123 and the flange 120 of the plunger 117 are cam rollers 128 which are secured rotatably in arcuate recesses 129 in the flange 120 as fully described above in connection with the form of the invention shown in FIG. 1.

In the operation of the form of the invention shown in FIG. 13, fluid pressure may be introduced through the inlet 106 and passage 107 to the bore 97 of the cylinder 96 whereupon such fluid pressure will impinge on the outer end of the flange 120 of the plunger 117 moving such plunger inwardly against the action of compression spring 122 and moving the rollers 128 into engagement with the inclined surfaces 125 which will permit radial inward movement of the locking detents 123 by reason of the camming action between the beveled end surface 124 on the detents 123 and the beveled end surface 98 on the cylinder 96. The bleed passage 119 will permit the escape of any fluid in the bore 115 inwardly of the plunger 117. Upon movement of the locking detents 123 inwardly and out of the annular recess 105, the piston 108 will move toward the right as viewed in FIG. 13 under the action of fluid pressure in the bore 97 of the cylinder 96. The piston 108 is returned to the left hand position as shown in FIG. 13 by the exertion of a force toward the left on the piston rod 110 and upon reaching the left hand end of the stroke, the string 122 will operate to move the rollers 128 in engagement with the inclined surfaces 125 to move the locking detents 123 radially outwardly into the annular recess 105 and engagement of the rollers 128 with the flat surfaces 126 on the inner ends of the locking detents 123 will serve to lock such detents in outermost locking position and prevent movement of the piston 108 until such time as fluid pressure is again introduced through the inlet 106.

Figure 14:
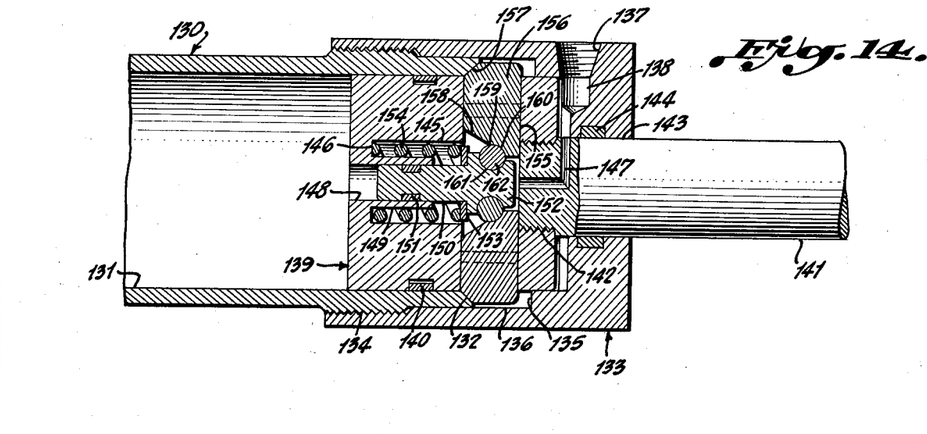
FIG. 14 is a fragmentary longitudinal sectional view similar to FIG. 13, but showing a single acting fluid pressure actuator and locking means for exerting a pulling action and with the device locked in position at the end of the stroke prior to exerting such pulling action.

With particular reference to FIG. 14, there is shown another form of single acting fluid pressure actuator and locking means constructed in accordance with this invention and which may well comprise an elongated hollow cylinder 130 having a bore 131 therein. The end surface 132 above the cylinder 130 is beveled outwardly and a cylinder head 133 may be detachably secured to the cylinder 130 by screw threaded fastening means 134 or by any other suitable means. The cylinder head 133 is provided with an internal shoulder 135 which is spaced from the beveled end 132 of the cylinder 130 and serves to provide an inwardly opening annular recess 136, the purpose of which will presently appear. A fluid pressure inlet 137 is provided in the cylinder head 133 and communicates through a passage 138 with the bore 131 of the cylinder 130.

A piston 139 is slidably received in the bore 131 of the cylinder 130 and suitable packing means 140 may be utilized on the piston 139 for providing a fluid pressure seal between the piston 139 and wall of the bore 131 of the cylinder 130. A piston rod 141 may be detachably connected by screw threaded fastening means or the like 142 to the piston 139 and the piston rod 141 is slidably received in an aperture 143 in the cylinder head 133 and suitable packing means 144 in the cylinder head 133 may engage the piston rod 141 to provide a fluid tight connection between such piston rod and the cylinder head 133.

The piston 139 is provided with a central axial bore 145 terminating at a point 146 within the piston 139 and communicating with the outer end of the bore 145 is a fluid pressure passage 147 in the piston rod 141, the passage 147 also communicating with the bore 131 of the cylinder 130. A second bore 148 of smaller diameter than the bore 145 and concentric therewith is provided in the piston 139 and the structure and relationship of the bores 145 and 148 is such as to provide a sleeve 149 therebetween. Slidably disposed in the bore 148 is a plunger 150 and suitable packing means 151 may be provided on the plunger 150 for engaging the wall of the bore 148. The plunger 150 is provided on the outer end thereof with an annular flange 152 and engaging the inner side of the flange 152 is a washer 153 which in turn is engaged by the outer end of a compression spring 154 disposed in the bore 145, the inner end of the spring 154 engaging the inner end 146 of the bore 145.

The piston 139 is provided with radial apertures 155 which serve to slidably receive locking detents 156 which are provided with beveled surfaces 157 on the outer ends thereof for cooperating with the beveled end surface 132 on the cylinder 130. The radial apertures 155 communicate with the bore 145 and the inner ends of the locking detents 156 are provided with inclined surfaces 158 which terminate in flat surfaces 159 which in turn merge into arcuate surfaces 160. Arcuate recesses 161 are provided in the flange 152 of the plunger 150 and cam rollers 162 are rotably received in the arcuate recesses 161 in the same manner as described above in connection with the form of the invention shown in FIG. 1.

The single acting fluid pressure actuator shown in FIG. 14 is designed to provide a pulling action and as shown in FIG. 14, the piston 139 and piston rod 141 are locked in position at one end of the stroke. When it is desired to exert a pulling action, it is only necessary to introduce fluid pressure through the inlet 137 and such fluid pressure will flow through the passage 147 in the piston rod 141 and impinge on the flange 152 of the plunger 150 which will result in moving the plunger 150 toward the left as viewed in FIG. 14 which will disengage the rollers 162 from the flat surfaces 159 on the locking detents 156 thereby permitting radial inward movement of the detents 156 by reason of the camming action between the beveled outer end surfaces 157 on the detents 156 and the beveled end surface 132 on the cylinder 130. Upon movement of the locking detents 156 out of the annular recess 136, fluid pressure will move the piston 139 and piston rod 141 toward the left as viewed in FIG. 14 to exert the desired pulling action.

By exerting a force toward the right as viewed in FIG. 14 on piston rod 141, the piston 139 may be moved to the position shown in FIG. 14 and upon reaching such position, the compression spring 154 will operate to move the plunger 150 toward the right as viewed in FIG. 14 which will result in engaging the rollers 162 with the inclined surfaces 158 on the locking detents 156 to move such detents outwardly into the annular recess 136 and continued movement of the plunger 150 toward the right as viewed in FIG. 14 will result in engaging the rollers 162 with the flat surfaces 159 on the inner ends of the locking detents 156 to lock such detents in outermost locking position and thereby prevent movement of the piston 139 and piston rod 141.

While the locking cam arrangements of FIGS. 13 and 14 have been described as identical with that shown in FIG. 1, obviously the locking detent structures shown in FIGS. 8 and 9, as well as FIGS. 10 to 12 may be utilized and furthermore, the arrangement of locking detents shown in FIGS. 6 and 7 may be utilized instead of the arrangement shown in FIGS. 4 and 5.

It will be obvious that by the above described invention there is provided a relatively simple, yet highly effective fluid pressure actuator and locking means in which the locking mechanism is relatively simple and strong, the structure being such as to eliminate all levers or toggle mechanisms and also providing a structure which is substantially foolproof in operation, in that both compression springs and fluid pressure may be utilized, either together or one in place of the other to operate the locking mechanism thereby reducing the likelihood of failure to a minimum and furthermore, the structure of this invention may be utilized for providing either a double acting or a single acting fluid pressure actuator.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A double acting fluid pressure actuator and locking means comprising an elongated hollow cylinder, each end surface of said cylinder being beveled outwardly, a cylinder head threadedly received on one end of said cylinder, an inwardly opening annular recess between said head and the adjacent end of said cylinder, means on said head for attaching the same to a cooperating structure, a fluid pressure inlet in said head communicating with said cylinder, a piston slidably received in said cylinder, packing means on said piston engaging the wall of said cylinder in fluid tight relationship, a piston rod connected to said piston and projecting from the opposite end of said cylinder, a second cylinder head threadedly received on the opposite end of said cylinder and surrounding said piston rod, packing means on said second cylinder head engaging said piston rod in fluid tight relationship, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, packing means on each plunger engaging the wall of the associated bore in fluid tight relationship, a fluid pressure passage in said piston between the first bore in one end of said piston and the second bore in the opposite end of said piston, a second fluid pressure passage between the first bore in said opposite end of said piston and the second bore in said one end of said piston, an annular flange on the outer end of each plunger, a compression spring between each flange and the inner end of the associated first bore, locking detents slidably disposed in said radial apertures, beveled surfaces on the outer ends of said detents for engaging the beveled end surfaces on said cylinder and cooperating locking cam means on the inner ends of said detents and on said flanges, said means including a roller and a camming surface, said roller rotatably engaging said camming surface as the detent moves whereby with said piston at one end of said cylinder, said detents will be cammed outwardly into the adjacent annular recess and locked in position by said locking cam means to lock said piston against movement and upon admission of fluid pressure into one end of said cylinder said plunger will be forced inwardly to release one of said detents to permit inward movement thereof and movement of said piston to the opposite end of said cylinder, the spring at the opposite end of said piston and fluid pressure through the passage to the second bore at the opposite end of said piston serving to move the associated plunger and move the other detent outwardly and lock the same in the annular recess in the opposite end of said cylinder to lock said piston against movement in the opposite direction.

2. A double acting fluid pressure actuator and locking means as defined in claim 1, in which said locking detents comprise four circumferentially spaced bolts at each end of said piston.

3. A double acting fluid pressure actuator and locking means as defined in claim 1 in which said locking detents comprise three circumferentially spaced bolts at each end of said piston.

4. A double acting fluid pressure actuator and locking means as defined in claim 1, in which said locking detents comprise two diametrically opposed bolts at each end of said piston.

5. A double acting fluid pressure actuator and locking means as defined in claim 1, in which said locking cam means comprises an inclined surface on the inner end of each detent, said inclined surface terminating in a flat surface disposed at right angles to the longitudinal axis of said detent, said flat surface merging into an arcuate surface, an arcuate recess in said flanges opposite each detent, the angular length of each recess being greater than one hundred eighty degrees, said roller being rotatably received in each recess with the axis of each roller being disposed at right angles to the longitudinal axis of each detent, the radius of each roller being substantially equal to the radius of each arcuate surface, whereby said rollers engage said inclined surfaces to move said detents outwardly and engage said flat surfaces and said arcuate surfaces to lock said detents in outermost position.

6. A double acting fluid pressure actuator and locking means as defined in claim 1, in which said locking cam means comprises an inclined surface on the inner end of each detent, said inclined surface terminating in a flat surface disposed at right angles to the longitudinal axis of each detent, an arcuate recess in said flanges opposite each detent, said roller being rotatably received in each recess with the axis of each roller being disposed at right angles to the longitudinal axis of each detent, whereby said rollers engage said inclined surfaces to move said detents outwardly and engage said flat surfaces to lock said detents in outermost position.

7. A double acting fluid pressure actuator and locking means as defined in claim 1, in which said locking cam means comprises an inclined surface on the inner end of each detent, said inclined surface terminating in a flat surface disposed at right angles to the longitudinal axis of said detent, said roller being rotatably mounted on said flanges opposite each detent with the axis of each roller being disposed at right angles to the longitudinal axis of each detent, whereby said rollers engage said inclined surfaces to move said detents outwardly and engage said flat surfaces to lock said detents in outermost position.

8. A double acting fluid pressure actuator and locking means as defined in claim 1, in which said locking cam means comprises an inclined surface on the inner end of each detent, said inclined surface terminating in a flat surface, said roller being rotatably mounted on said flanges opposite each detent, whereby said rollers engage said inclined surfaces to move said detent outwardly and engage said flat surfaces to lock said detent in outermost position.

9. A double acting fluid pressure actuator and locking means as defined in claim 1, in which said locking cam means comprises an arcuate recess in the inner end of each detent, the angular length of each recess being greater than one hundred eighty degrees, said roller being rotatably received in each recess with the axis of each roller being disposed at right angles to the longitudinal axis of each detent, an inclined surface extending inwardly from the outer end of each flange opposite each detent, said inclined surface terminating in a flat surface disposed at right angles to the longitudinal axis of each detent, whereby said rollers engage said inclined surfaces to move said detents outwardly and engage said flat surfaces to lock said detents in outermost position.

10. A double acting fluid pressure actuator and locking means as defined in claim 1, in which said locking cam means comprises an arcuate recess in the inner end of each detent, said roller being rotatably received in each recess with the axis of each roller being disposed at right angles to the longitudinal axis of each detent, an inclined surface extending inwardly from the outer end of each flange opposite each detent, said inclined surface terminating in a flat surface disposed at right angles to the longitudinal axis of said detent, whereby said rollers engage said inclined surfaces to move said detents outwardly and engage said flat surfaces to lock said detents in outermost position.

11. A double acting fluid pressure actuator and locking means as defined in claim 1, in which said roller is rotatably mounted on the inner end of each detent with the axis of each roller being disposed at right angles to the longitudinal axis of each detent, an inclined surface extending inwardly from the outer end of each flange opposite each detent, said inclined surface terminating in a flat surface disposed at right angles to the longitudinal axis of said detent, whereby said rollers engage said inclined surfaces to move said detents outwardly and engage said flat surfaces to lock said detents in outermost position.

12. A double acting fluid pressure actuator and locking means as defined in claim 1, in which said roller is rotatably mounted on the inner end of each detent, an inclined surface extending inwardly from the outer end of each flange opposite each detent, said inclined surface terminating in a flat surface, whereby said rollers engage said inclined surfaces to move said detents outwardly and engage said flat surfaces to lock said detents in outermost position.

13. A fluid pressure actuator and locking means comprising an elongated hollow cylinder, one end surface of said cylinder being beveled outwardly, a cylinder head threadedly received on said one end of said cylinder, an inwardly opening annular recess between said head and the adjacent end of said cylinder, a fluid pressure inlet in said head communicating with said cylinder, a piston slidably received in said cylinder, packing means on said piston engaging the wall of said cylinder in fluid tight relationship, a piston rod connected to said piston, a central axial bore in said piston opening toward said head, a radial aperture in said piston communicating with said bore, a second bore in said piston concentric with said first bore and of smaller diameter, a plunger slidably disposed in said second bore, packing means on said plunger engaging the wall of said second bore in fluid tight relationship, an annular flange on the outer end of said plunger, a compression spring between said flange and the inner end of said first bore, a locking detent slidably disposed in said radial aperture, a beveled surface on the outer end of said detent for engaging the beveled end surface on the cylinder, and cooperating locking cam means on the inner end of said detent and on said flange, said means including a roller and a camming surface, said roller rotatably engaging said camming surface as the detent moves whereby with said piston at said one end of said cylinder said detent will be cammed outwardly into said annular recess and locked in position by said locking cam means to lock said piston against movement and upon admission of fluid pressure to said one end of said cylinder said plunger will be forced inwardly to release said detent to permit inward movement thereof and movement of said piston.

References Cited in the file of this patent

UNITED STATES PATENTS

| | | |
|---|---|---|
| 1,933,731 | Hanna | Nov. 7, 1933 |
| 2,435,727 | Spencer | Feb. 10, 1948 |
| 2,492,094 | Fischer | Dec. 20, 1949 |
| 2,764,132 | Bakke | Sept. 25, 1956 |
| 2,965,073 | Alfieri | Dec. 20, 1960 |
| 2,974,638 | Chace | Mar. 14, 1961 |
| 2,997,985 | Chace | Aug. 29, 1961 |
| 3,008,454 | Wilkins | Nov. 14, 1961 |
| 3,022,771 | Chace | Feb. 27, 1962 |